United States Patent
Koning

(10) Patent No.: US 12,505,041 B2
(45) Date of Patent: Dec. 23, 2025

(54) USING DIRECTORY DELEGATION FOR CLIENT SIDE CACHE OPERATIONS

(71) Applicant: Dell Products, L.P., Round Rock, TX (US)

(72) Inventor: G. Paul Koning, New Boston, NH (US)

(73) Assignee: DELL PRODUCTS L.P., Round Rock, TX (US)

( * ) Notice: Subject to any disclaimer, the term of this patent is extended or adjusted under 35 U.S.C. 154(b) by 131 days.

(21) Appl. No.: 18/411,266

(22) Filed: Jan. 12, 2024

(65) Prior Publication Data

US 2025/0231879 A1     Jul. 17, 2025

(51) Int. Cl.
| | |
|---|---|
| *G06F 12/0815* | (2016.01) |
| *G06F 16/172* | (2019.01) |
| *G06F 16/176* | (2019.01) |
| *G06F 16/23* | (2019.01) |

(52) U.S. Cl.
CPC ........ *G06F 12/0815* (2013.01); *G06F 16/172* (2019.01); *G06F 16/176* (2019.01); *G06F 16/235* (2019.01)

(58) Field of Classification Search
None
See application file for complete search history.

(56) References Cited

U.S. PATENT DOCUMENTS

| | | | | |
|---|---|---|---|---|
| 6,732,237 | B1* | 5/2004 | Jacobs | G06F 12/0897 |
| | | | | 711/119 |
| 7,552,223 | B1* | 6/2009 | Ackaouy | G06F 16/10 |
| | | | | 709/213 |
| 7,890,529 | B1* | 2/2011 | Srinivasan | G06F 16/134 |
| | | | | 707/781 |
| 7,921,179 | B1* | 4/2011 | Zheng | G06F 16/176 |
| | | | | 709/213 |
| 2004/0243644 | A1* | 12/2004 | Steere | G06F 16/10 |
| 2010/0185704 | A1* | 7/2010 | George | G06F 12/0815 |
| | | | | 707/821 |
| 2010/0293338 | A1* | 11/2010 | Krishnaprasad | G06F 16/9014 |
| | | | | 711/E12.001 |
| 2012/0072596 | A1* | 3/2012 | Kruse | G06F 21/6227 |
| | | | | 711/E12.017 |
| 2020/0019514 | A1* | 1/2020 | Desai | G06F 12/123 |
| 2020/0349119 | A1* | 11/2020 | Yang | G06F 16/1734 |
| 2023/0118118 | A1* | 4/2023 | Koning | G06F 16/172 |
| | | | | 707/769 |

* cited by examiner

*Primary Examiner* — Kaushikkumar M Patel
(74) *Attorney, Agent, or Firm* — Amin, Turocy & Watson, LLP

(57) ABSTRACT

Architectures and techniques are described that can leverage directory delegation functions or techniques in order to provide cache coherency. The disclosed techniques can operate for a client side cache that exists in either the user space or domain or the kernel space or domain. A directory delegation request can be transmitted to a file system server that requests a notification relating to updates to a specified file system element (e.g., a file). In response to receiving an associated directory delegation notification, information in the notification can be employed to perform a client side cache update procedure and/or a client side cache preload procedure.

20 Claims, 11 Drawing Sheets

USING DIRECTORY DELEGATION FOR CLIENT SIDE CACHE OPERATIONS

BACKGROUND

Storage or data service providers typically seek to manage customer data efficiently and securely, which can be effectuated via a client side cache. A cache represents state information about remote data (e.g., file system data on a remote file system server). Providers of high performance distributed file systems frequently rely on client side caching in order to reduce the number of interactions with the file system server. For example, once a name for an element (e.g., a file, a directory, or the like) has been looked up on the file system server and the handle (e.g., an identifier) of the element with that name has been received, it is desirable not to continue accessing the file system server for references to that element, since the state of that element can instead be stored locally in a cache. Similarly, once attributes for an element (e.g., file length) have been obtained, it is desirable to cache this information locally and rely on the local cache for information about that element, provided the state of the element has not changed on the file system server.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
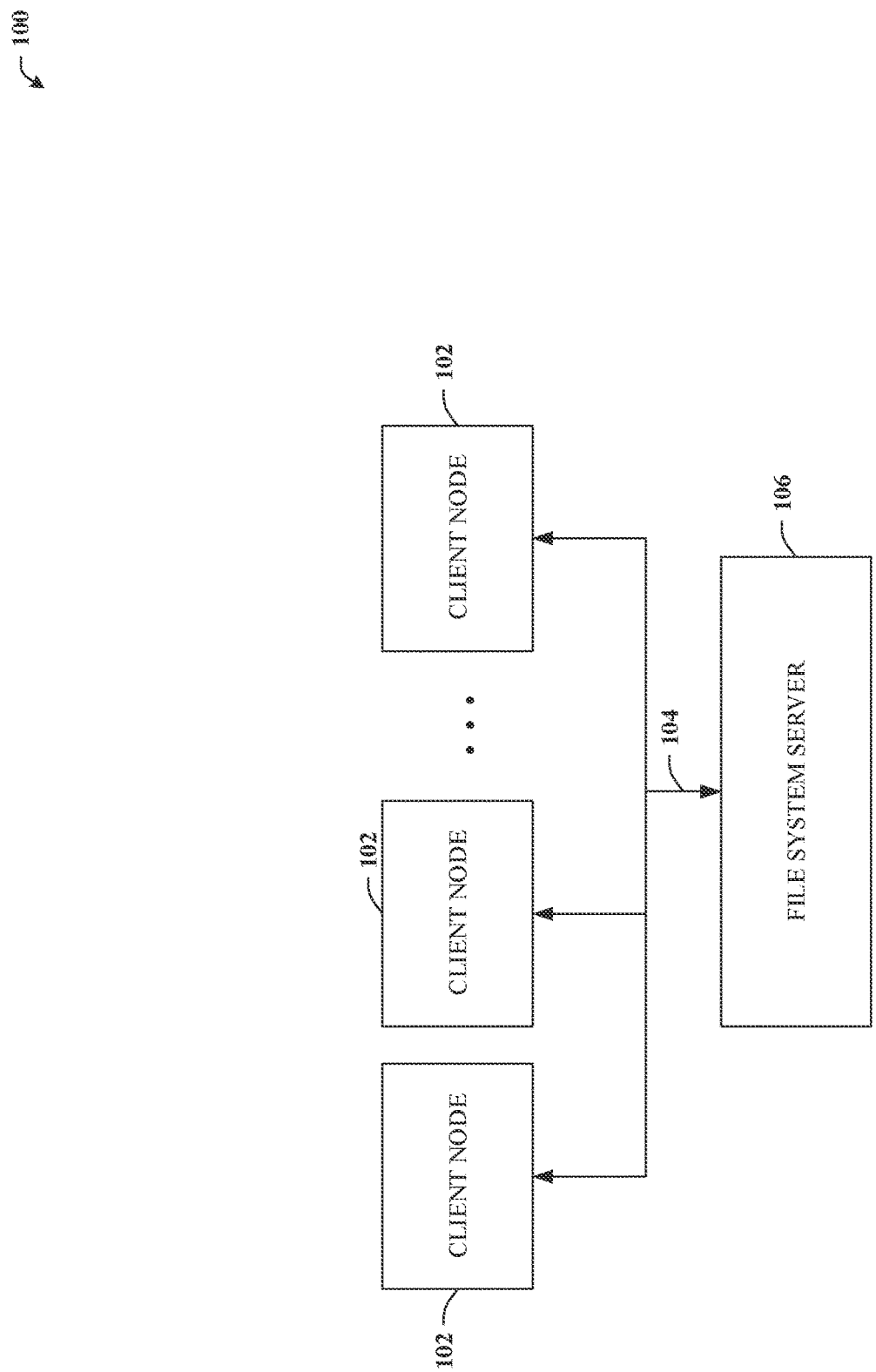
FIG. 1 depicts a schematic block diagram illustrating a physical architecture having various clients interacting with a file system server in a distributed manner in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

As indicated in the background section, it is desirable to cache information locally and rely on the local cache for information about that element, provided the state of the element has not changed on the file system server. If the state of the element has changed on the file system server, then the information in the local cache can be out of date and/or invalid. Maintaining up-to-date information in the local cache that accurately describes the state of the same file system elements in the file system server is referred to herein as cache coherency To provide additional context, consider an example physical architecture of a distributed data service provider, illustrated in connection with FIG. 1. FIG. 1 depicts a schematic block diagram 100 illustrating various client nodes interacting with a file system server in a distributed manner in accordance with certain embodiments of this disclosure.

Client nodes 102 can be geographically distant from one another, but expect to be provided access to the same data that is up-to-date, regardless of which client node 102 within the distributed system is accessing the file system server 106, via network 104. In some embodiments, client nodes 102 can represent various nodes of a network attached storage (NAS) system, which is used herein as representative, but it is appreciated that other suitable storage systems may be used such as storage area network (SAN) or others.

Each client node 102 (e.g., a NAS node) can execute applications or processes, which can make file requests to an associated client node 102 via an interface such as portable operating system interface (POSIX), which is further detailed in connection with FIG. 2. For example, a request to access or change a particular file or other file system element can be routed, via network 104, to a file system server 106, which can maintain the file system according to a defined protocol. As a representative example, the disclosed techniques can employ network file system (NFS), but it is appreciated that other suitable file system protocols can be suitable such as, for example, Common Internet File System/Server Message Block (CIFS/SMB) or others.

With regard to client side caching, a given client node 102 can store state information about certain elements maintained on file system server 106 so that requests received via the interface (e.g., POSIX) can be acted upon without communication across network 104.

Figure 2:
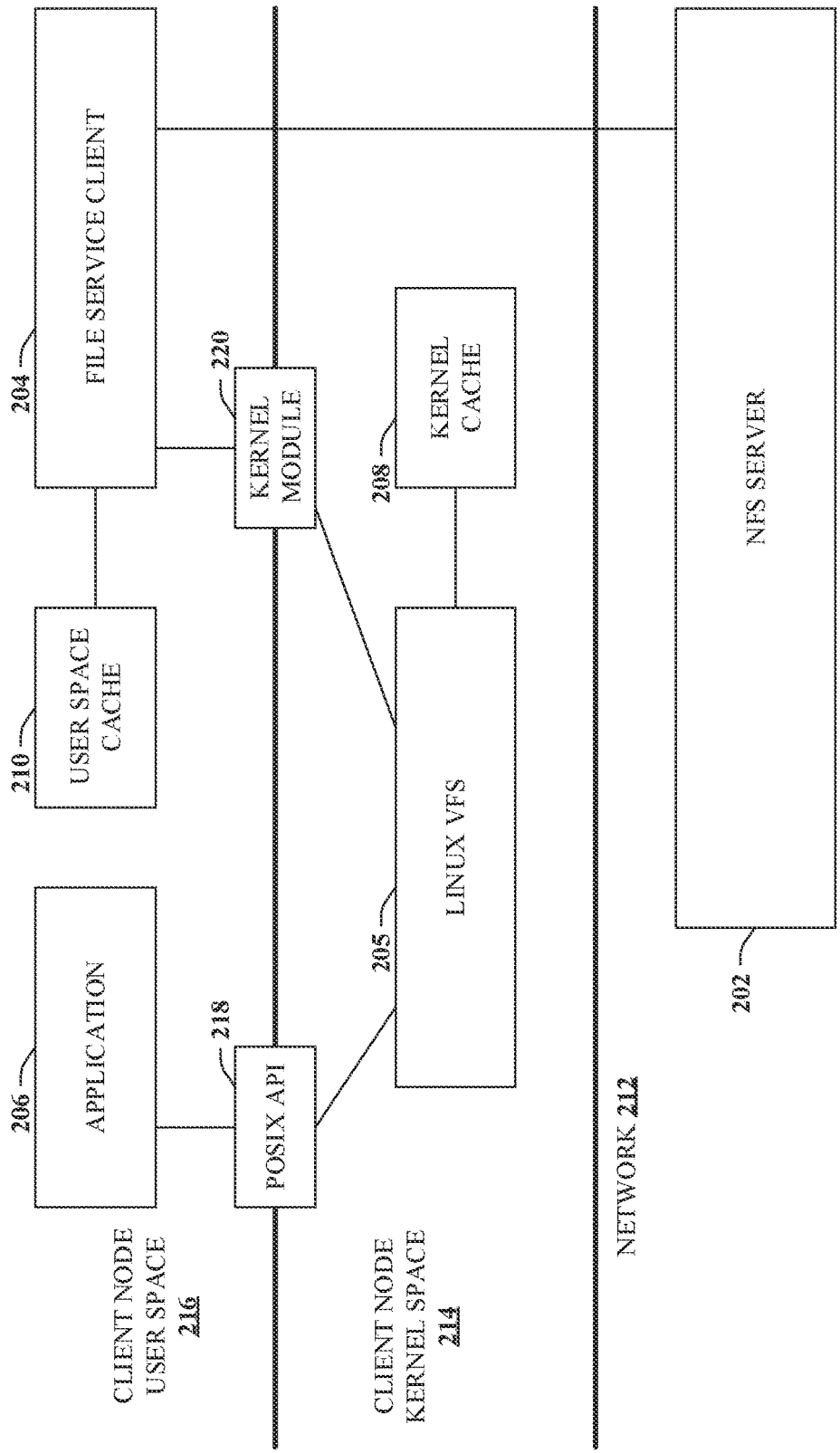
FIG. 2 depicts a schematic block diagram illustrating an example logical architecture of a distributed data service provider in accordance with certain embodiments of this disclosure.

Referring now to FIG. 2, schematic block diagram 200 is depicted illustrating an example logical architecture of a distributed data service provider in accordance with certain embodiments of this disclosure. As illustrated, an NFS server 202 can be accessed via network 212. NFS server 202 can be an example representation of file system server 106 that operates according to an NFS protocol. Hence, by communicating over network 212, file service client 205 can access NFS server 202.

As noted, it can be beneficial to cache information locally, that is, on the client side of network 212. Depending on implementation, the client side cache can be kernel cache 208, user space cache 210, or combinations thereof, which can be physically located on the client node (e.g., client node 102). As illustrated, kernel cache 208 is within client node kernel space 214, whereas user space cache 210 is within client node user space 216. Regardless of implementation, using a client side cache (e.g., kernel cache 208 and/or user space cache 210) can allow state information to be accurately reflected without calls to NFS server 202, which can be significantly more expensive in terms of time (e.g., latency) and resource utilization.

In terms of implementation, it is to be understood that there are different techniques for file system client 204 implementation. In some implementations, the entirety of file system client 204 and associated protocols (e.g., NFS) was implemented in kernel space 214. As a representative example, the operating system can be Linux, but other operating systems might be used.

Alternatively, in other architectures, an implementation of NFS protocol or client code can be contained in client node user space 216, for instance executed by a process of the client node. The latter implementation in which file service client 204 is implemented in client node user space 216 is employed as representative for the remainder of this disclosure. Thus, this software can run essentially as an application on the operating system, where the bulk of the software involved is contained in an operating system (e.g., Linux) process running in client node user space 216. Hence, this implementation operates similar to an application communicating over a network with NFS server 202. One difference is that the application can be connected to client node kernel space 214 via kernel module 220. Kernel module 220 can provide NFS file access services to any application that works with the file system data. For example, kernel module 220 can operate to connect a virtual file system (VFS) (e.g., Linux VFS 205 in this case) or other suitable kernel file system elements to file service client 204. While the representative implementation is used herewith, it is understood that techniques detailed herein can be applicable to other standard implementations as well.

It is to be appreciated that in a standard NFS implementation (e.g., a Linux NFS implementation on a Linux client) the application issues a request for a file (or other file system element) directly to the Linux kernel. The Linux kernel then performs the NFS protocol operations completely within the kernel. In this case, kernel cache 208 is the only viable option for a client side cache.

Alternatively, the NFS protocol code can be implemented as a client node user space 216 as illustrated here in with reference to file service client 204. In this scenario there can be two components involved in the processing of requests on the client side: There's the Linux kernel module (e.g., kernel module 220) which can control the Linux file system objects representing the application referring to data. Secondly, there is application 206, which is sometimes referred to as a software defined NAS or SD-NAS.

As illustrated, a given application 206 can communicate to Linux VFS 205 (or another suitable element of client node kernel space 214) via some file application programming interface (API) such as POSIX API 218. In client node kernel space 214, such can involve communication with certain file system services such as a VFS layer in Linux. The kernel (e.g., an element of client node kernel space 214) can then communicate with a separate user space process via kernel module 220.

In the context of the representative implementation, there are multiple ways to implement a client side cache. For example, the client side cache can be deployed in client node kernel space 214 (e.g., as kernel cache 208), deployed in client node user space 216 (e.g., user space cache 210), or combinations of the two. Implementing a client side cache as user space cache 210 can be simpler. On the other hand, implementing a client side cache as kernel cache 208 can be more efficient, as further detailed in connection with FIG. 3 and herein.

Example Systems

Figure 3:
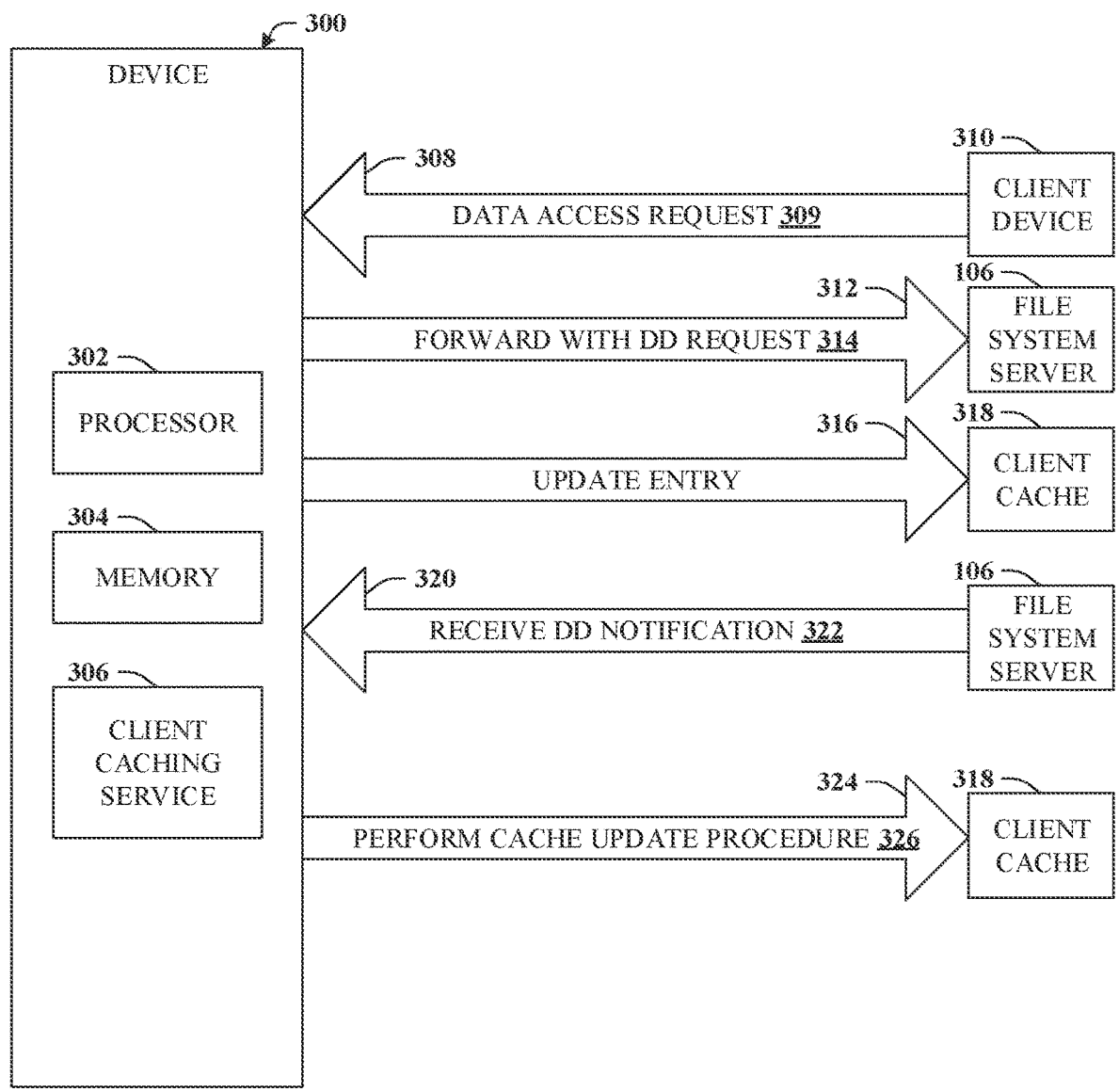
FIG. 3 depicts a schematic block diagram illustrating an example device configured to leverage directory delegation in order to maintain cache coherency for a client side cache in accordance with certain embodiments of this disclosure.

With reference now to FIG. 3, a schematic block diagram is depicted illustrating an example device 300 that can leverage directory delegation in order to maintain cache coherency for a client side cache in accordance with certain embodiments of this disclosure. In some embodiments, device 300 can be a caching device or caching service device that operates on a client side of a distributed data storage network as illustrated in the context of FIGS. 1 and 2. Hence, device 300 can be implemented in whole or in part in either or both of user space 216 or kernel space 214.

Device 300 can comprise a processor 302 that, potentially along with client caching service/device 306, can be specifically configured to perform functions associated with caching and/or state-saving functions of a file system or associated elements (e.g., files, directories, . . . ). Device 300 can also comprise memory 304 that stores executable instructions that, when executed by processor 302, can facilitate performance of operations. Processor 302 can be a hardware processor having structural elements known to exist in connection with processing units or circuits, with various operations of processor 302 being represented by functional elements shown in the drawings herein that can require special-purpose instructions, for example, stored in memory 304 and/or client caching service/device 306. Along with these special-purpose instructions, processor 302 and/or client caching service/device 306 can be a special-purpose device. Further examples of the memory 304 and processor 302 can be found with reference to FIG. 10. It is to be appreciated that device 300 or computer 1002 can represent a server device or a client device of a network or data services platform and can be used in connection with implementing one or more of the systems, devices, or components shown and described in connection with FIG. 3 and other figures disclosed herein.

As illustrated at reference numeral 308, device 300 can receive data access request 309. Data access request 309 can be received from client device 310 and can represent a request to perform an operation on an element (e.g., a file, directory, or other element) of a file system of a file system server such as file system server 106 or NFS server 202. As used herein, client device 310 can be representative of physical hardware (e.g., client node 102) or an application or process running on the physical hardware.

As examples, client device 310 might transmit a request to open a file, create a directory, save changes to a file, and so on. At reference numeral 312, device 300 can forward data access request 309 along with a directory delegation (DD) request 314 to file system server 106, which in some embodiments can be an NFS server such as NFS server 202. Directory delegation request 314 can be any suitable request to a file system server for notifications relating to updates to a specified file system element. For instance, directory delegation request 314 can be a request to be notified when a specified directory is added, removed, or changes names; when attributes of a specified file change; or the like.

In the case of file system server 106 using an NFS protocol, the NFS V4.1 protocol standard provides, as an optional feature, a directory delegation function. While the directory delegation function is not required by the standard, such can be leveraged by the disclosed techniques to provide cache coherency for a client side cache. In NFS, directory delegation represents a technique by which the file system server delegates the management of a file to a client. In other protocol implementations, provided the file system protocol allows notifications about specified file system elements and/or the ability to delegate, such can operate in a similar manner.

In some embodiments, directory delegation request 314 can configurably specify the information that is to be included in subsequent notifications (e.g., directory delegation notification 322, described below), which is further detailed in connection with FIG. 4.

Figure 4:
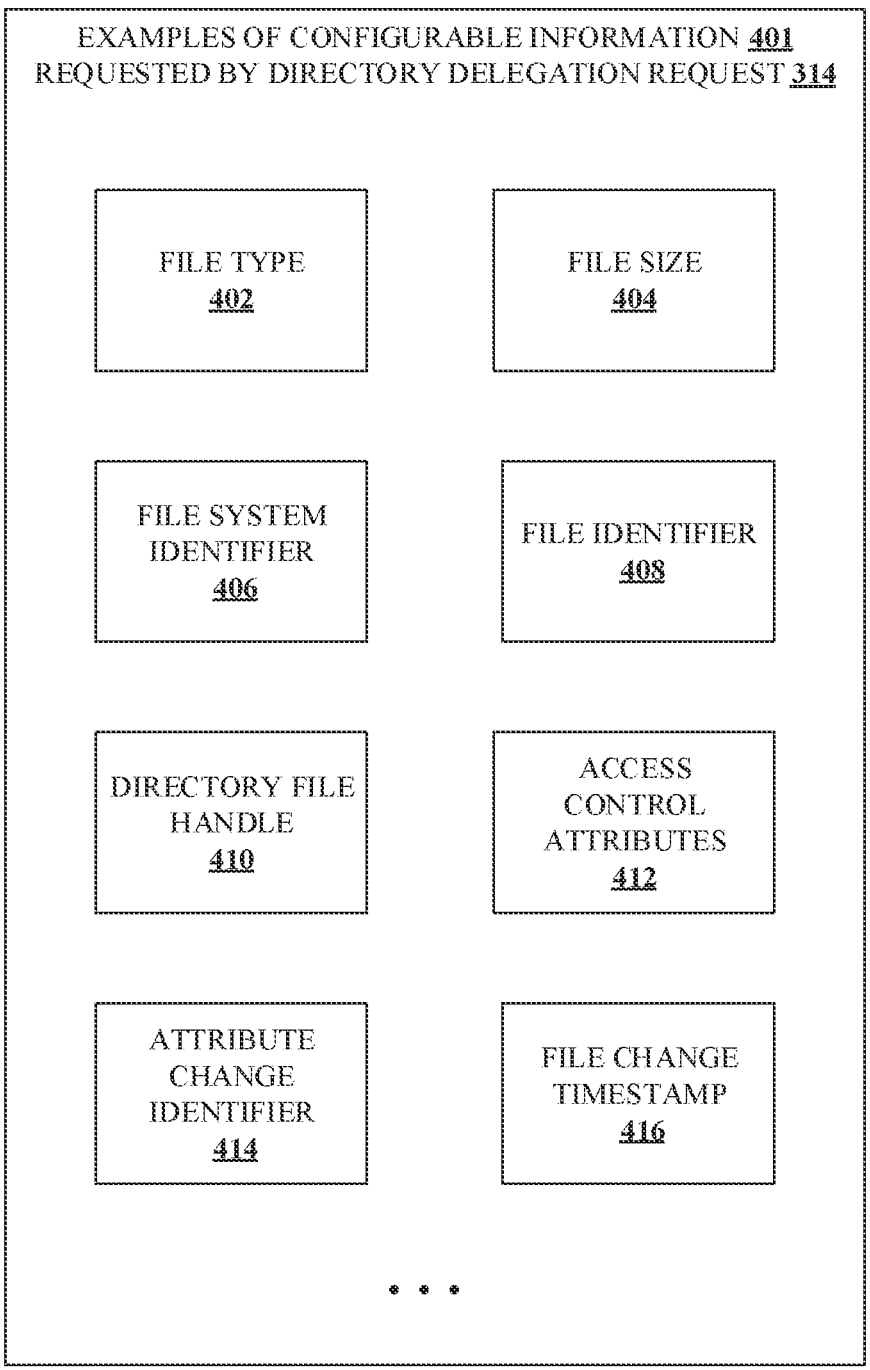
FIG. 4 depicts a schematic block diagram illustrating various examples of configurable information that can be requested by the directory delegation request in accordance with certain embodiments of this disclosure.

While still referring to FIG. 3, but turning now as well to FIG. 4, a schematic block diagram 400 is depicted illustrating various examples of configurable information 401 that can be requested by the directory delegation request 314 in accordance with certain embodiments of this disclosure. Hence, by proxy, configurable information 401 can represent information that can be configurably included in a given directory delegation notification 322.

For example, in the case the file system element is a file, configurable information 401 can include file type 402 and file size 404. File type 402 can be indicative of a type of the file. File size 404 can indicate a size of the file in any suitable units (e.g., bytes).

Configurable information 401 can also include file system identifier 406 and file identifier 408. As representative examples, file system identifier 406 can be an NFS (or other file system protocol) handle for the element, whereas file identifier 408 can be the inode number. Either of these might be used to identify a given file within a given file system, but it is observed that the inode number is not guaranteed to be unique for all time, whereas the NFS handle is. Therefore, advantageously, file system identifier 406 can be used as a lookup reference or key within the context of a client side cache.

Configurable information 401 can further include directory file handle 410 that can uniquely identify a given directory. Configurable information 401 can include access control attributes 412. Examples of access control attributes 412 can be an indication of a file mode, a file owner, or the like. Configurable information 401 can include attribute change identifier 414, file change timestamp 416, or any other suitable information. Attribute change identifier 414 can identify which particular attributes, if any, have been changed. File change timestamp 416 can identify a time at which the file or other element was last changed, which can, e.g., be used to indicate whether state information stored in client side cache (e.g., client cache 318, which can be implemented in the context of either user space cache 210 or kernel cache 208 or both) is valid and/or up-to-date To provide a concrete example of the above discussion, suppose a client of a distributed data service provider attempts to open a file "file.txt". This operation can be routed to an OS kernel (e.g., OS kernel 218) and can be received as detailed above as data access request 309. The OS kernel can access a local cache (e.g., kernel cache 208) to determine whether any state information about that file is stored locally and such information is authoritative (e.g., valid/up-to-date). If so, then the request to open file.txt can be satisfied without going to the authoritative source at file system server 106.

In the representative implementation, behind the scenes, if authoritative state information about file.txt is not found in kernel space 214, the data access request can be forwarded to a process in user space 216, where that process can perform a similar procedure with respect to user space cache 210 to determine whether authoritative information relating to file.txt is stored there.

If not, then data access request 309, formatted according to the protocol of file system server 106 can be forwarded to file system server 106, which is illustrated at reference numeral 312 where such is forwarded. In this case, directory delegation request 314 is transmitted to file system server 106 as well, in order to indicate that pertinent notifications about file.txt are requested.

File system server 106 can then respond to both requests. Regarding data access request 309, authoritative state information regarding file.txt can be transmitted, which could indicate attributes of the file and so forth or that no such file exists. Either way, data access request 309 from client device 310 can be satisfied and client cache 318 can be updated accordingly so that subsequent requests regarding file.txt can potentially be satisfied without communication with file system server 106. Updating client cache 318 in this manner is illustrated at reference numeral 316 in which the entry related to (e.g., potentially keyed by file system identifier 406) file.txt of a given directory is updated. In some embodiments, updating the entry can be invoked due to the directory delegation request 314. In other words, the fact that directory delegation request 314 is provided can imply that the associated file system element is important or may be beneficial to store state information locally.

In addition, it is again noted that directory delegation request 314 was also provided to file system server 106. Provided file system server assents to the directory delegation request 314, agreeing to send notifications when certain changes occur with the specified file or element change, device 300 can employ such as a cache coherency mechanism.

For example, at some subsequent time, at reference numeral 320, device 300 can receive directory delegation notification 322 from file system server 106. As noted, directory delegation notification 322 can indicate that the specified file system element (in this example, the file, 'file.txt') has been updated in some manner that triggers the notification, which can be configurable, as indicated.

Upon receipt of directory delegation notification 322, device 300 can, at reference numeral 324, perform cache update procedure 326 in order to update the entry relating to 'file.txt' in client cache 318. Cache update procedure 326 can take one of two distinct approaches, which are further detailed in connection with FIG. 5. However, regardless of the particular approach, upon completion, client cache 318 can have reliable information regarding the file system element in question.

Figure 5:
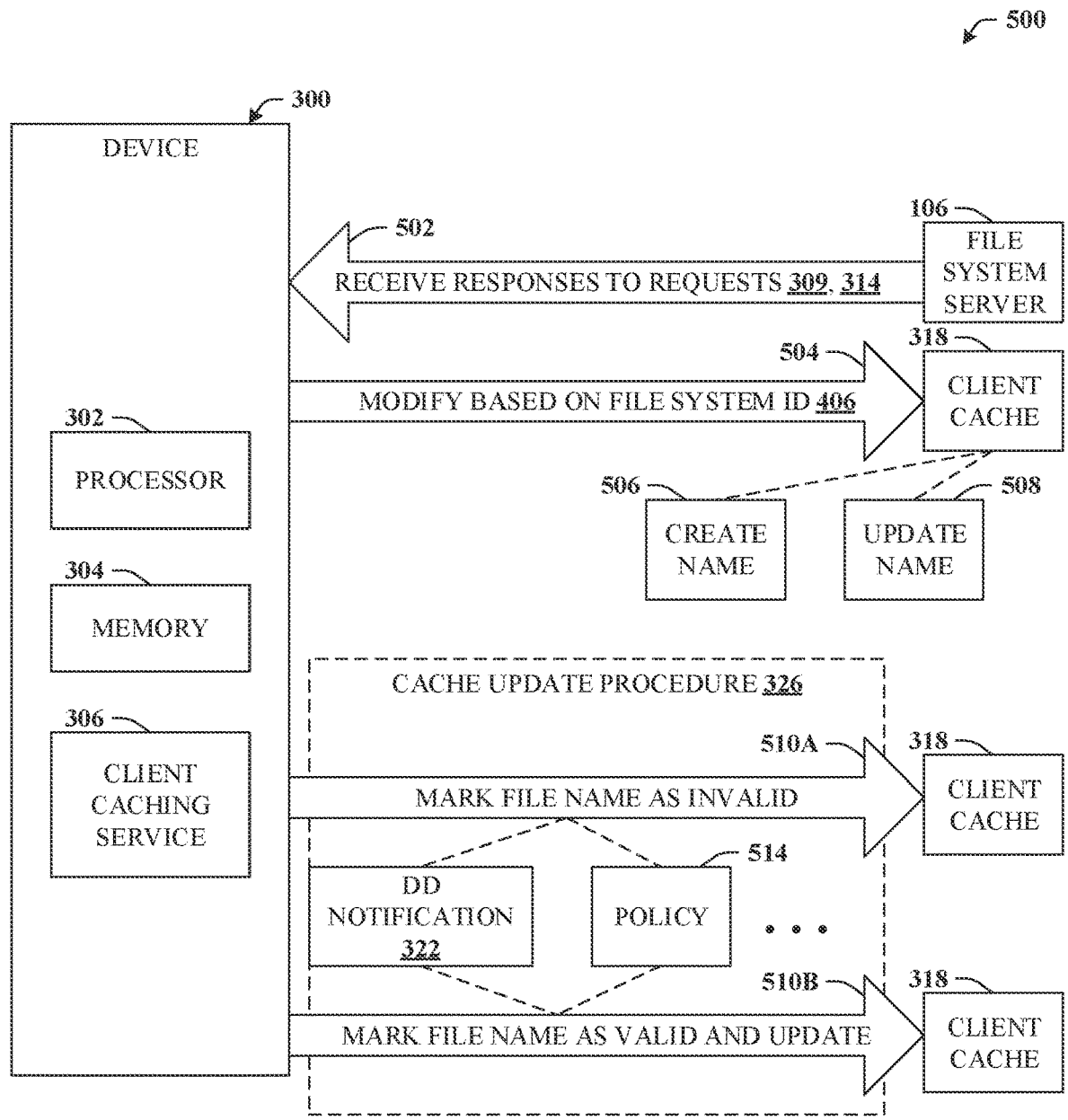
FIG. 5 depicts a schematic block diagram illustrating addition detail relating to different cache updating approaches in the context of leveraging directory delegation in order to maintain cache coherency for a client side cache in accordance with certain embodiments of this disclosure.

Referring now to FIG. 5, a schematic block diagram 500 is depicted illustrating addition detail relating to different cache updating approaches in the context of leveraging directory delegation in order to maintain cache coherency for a client side cache in accordance with certain embodiments of this disclosure. For example, at reference numeral 502 device 300 can receive response to data access request 309 and directory delegation request 314, which was described above in connection with FIG. 3.

Regarding the response to data access request 309, as was noted at reference numeral 316, the entry (e.g., for 'file.txt') can be updated. In more detail, it is appreciated that device 300 can, as illustrated at reference numeral 504, perform any suitable type of modification and that such can be explicitly based on file system ID 406. As indicated, file system ID 406 is unique across all time, whereas inode numbers are not guaranteed to be so. Therefore, in the context of a cache, which can conceivably store state information for a significant duration, file system ID 406 can be advantageous over an inode number to use as a reference or key for the specified file system element.

Thus, the indicated modification relating to the entry, file.txt, can be identified by file system ID 406. If no information is currently stored about that particular name, then the name can be created in client cache 318, as illustrated at reference numeral 506. Such can be advantageous because a directory delegation request 314 was sent for that name, which indicates that particular file system element is of interest. If an entry for the name already exists in client cache 318, then that entry can be updated, as indicated at reference numeral 508, with the authoritative information recently received from file system server 106 in order to satisfy the data access request 309.

Assuming file system server 106 responds affirmatively to directory delegation request 314, at some subsequent time, device 300 can receive directory delegation notification 322, as detailed in connection with reference numeral 320 of FIG. 3. In response, cache update procedure 326 can be performed, which can take distinct approaches depending on implementation.

For example, at reference numeral 510A, device 300 can mark the element or file name as invalid and/or that it is not authoritative. In contrast, at reference numeral 510B, device 300 can set the element or file name as valid and update according to information indicated in directory delegation notification 322.

It is appreciated that since the directory delegation notification 322, by its existence, means that the specified element was changed at file system server 106, associated information in client cache 318 is no longer authoritative. According to approach 510A, by marking the name and/or entry in client cache 318 as invalid, such guarantees that subsequent references to that name will be routed to file system server 106.

While this approach does not fully leverage efficiencies of maintaining client cache 318, it guarantees that information in client cache 318 is correct/reliable. In certain implementations, this approach can be preferred as it can be efficient with certain workloads or may readily deal with situations in which directory delegation notification 322 lacks certain information, such as when file server 106 does not or cannot be configured as expected.

Therefore, in some embodiments, the selection between approach 510A or 510B can be based on the character of directory delegation notification 322 (e.g., does notification 322 contain sufficient information) or some policy 514 factors such as the type of workload, client, or the like.

In further detail, in the context of NFS, a standard NFS directory delegation notification can contain a notification type as follows:
    enum notify_type4 {
        NOTIFY4_CHANGE_CHILD_ATTRS=0,
        NOTIFY4_CHANGE_DIR_ATTRS=1,
        NOTIFY4_REMOVE_ENTRY=2,
        NOTIFY4_ADD_ENTRY=3,
        NOTIFY4_RENAME_ENTRY=4,
        NOTIFY4_CHANGE_COOKIE_VERIFIER=5
    };

Out of a total of six settings (e.g., 0-5), the disclosed techniques can leverage all or a portion of the first five to perform cache coherency techniques. The remaining data in the notification can depend on the notification type or other suitable factors. With the exception of CHANGE_DIR_ATTRS, the notification includes the name of the file to which the notification applies. In the case of a rename operation, the old name and the new name can also be given. In addition, attributes of the file can be included. In accordance with the disclosed techniques, these attributes are desirable to include, with a potential exception for the remove notification where there is no need in certain embodiments.

As indicated, the list of attributes to be reported can be configured, e.g., by device 300 or by file system server 106. Examples have been provided in FIG. 4, but it is appreciated that potentially any attributes a file can have for a given protocol can be requested as part of configurable information 401.

For most notifications 322, the file system server 106 might send all attributes, but in a file attributes change notification, e.g., due to a write to the file, file system server 106 might only send the new length and the new timestamps. Regardless, it is observed that if the file state for a given entry already exists in client cache 318, upon receipt of notification 322, if all attributes are provided, that information can be used to update the previously saved attributes and the entry can be set as valid/authoritative (e.g., approach 510B). If only some attributes are received and the attributes not received were marked as authoritative in client cache 318, those non-received attributes can in some embodiments be deemed to remain valid.

On the other hand, if the cache entry was had attributes that were not valid/authoritative, and only some attributes are supplied by notification 322, any non-received attributes that were invalid remain so.

Figure 6A:
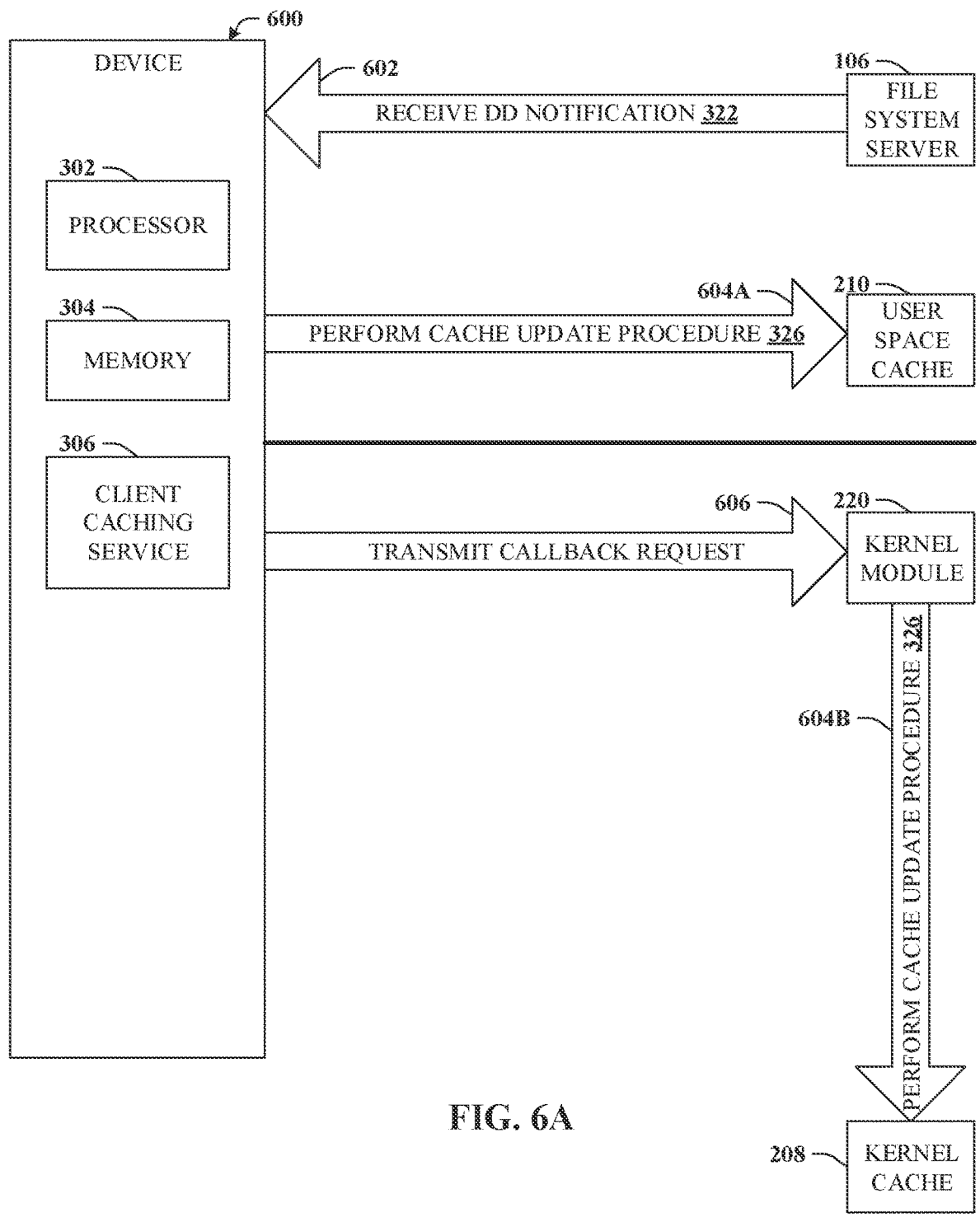
FIG. 6A depicts a schematic block diagram illustrating an example device that can leverage directory delegation in order to maintain cache coherency for a client side cache situated either in a user space or a kernel space in accordance with certain embodiments of this disclosure.

With reference now to FIG. 6A, a schematic block diagram is depicted illustrating an example device 600 that can leverage directory delegation in order to maintain cache coherency for a client side cache situated either in a user space or a kernel space in accordance with certain embodiments of this disclosure. Device 600 can be substantially similar to device 300. Implementation of device 600 can be according to function and as explained previously, client cache 318 can be situated in either or both user space 216 or kernel space 214. Hence, client cache 318 can maintain information wholly or in part in either of user space cache 210 or kernel cache 208.

Utilizing user space cache 210 can be simpler to implement, but it is noted that utilization of kernel cache 208 can be more efficient. Observing that a client device and/or application executing on the client device that may make data access requests can come from any source at any time. Therefore, information stored in user space cache 210 can require extra operations that cross the user space 216/kernel space 214 boundary. It is noted that a different client device, potentially on a different node can create, delete or otherwise make changes to the file, which is ultimately recorded by the file system server. Thus, since kernel cache 208 is closer to the application or device making a subsequent request, utilizing kernel cache 208 can be preferred, although such is not as simple to implement.

As illustrated at reference numeral 602, it is assumed that device 600 receives directory delegation notification 322, informing of a change to a specified file system element. As illustrated by reference numeral 604A, user space cache 210 is utilized, so cache update procedure 326 can be directly applied to user space cache 210 based on the contents of notification 322. Additionally or alternatively, as illustrated by reference numeral 604B, kernel cache 208 is utilized. Hence, cache update procedure 326 can be applied to kernel cache 208.

In the context of user space cache 210, a process executing within client node user space 216 can receive directory delegation notification 322. Thereafter, cache update procedure 326, as detailed herein can be directly performed on user space cache 210, potentially using information in notification 322 to maintain cache coherency.

In the context of kernel cache 208, the process executing within client node user space 216 can receive directory delegation notification 322, parse notification 322 and generate a callback request/message formatted in a manner expected by the kernel module (e.g., kernel module 220). Such is illustrated at reference numeral 606. As detailed previously, kernel module 220 can operate as a connector between file service client 204 within client node user space 216 and the kernel file system machinery of client node kernel space 214. In the case of a received directory delegation notification 322, file service client 204 can construct the callback request, which is provided to kernel module 220. Kernel module 220 can then process the information provided in the callback request to issue a corresponding update or invalidate operation(s) at kernel cache 208. In that case, cache update procedure 326 can operate in response to the callback request that essentially contains the information provided by directory delegation notification 322.

Figure 6B:
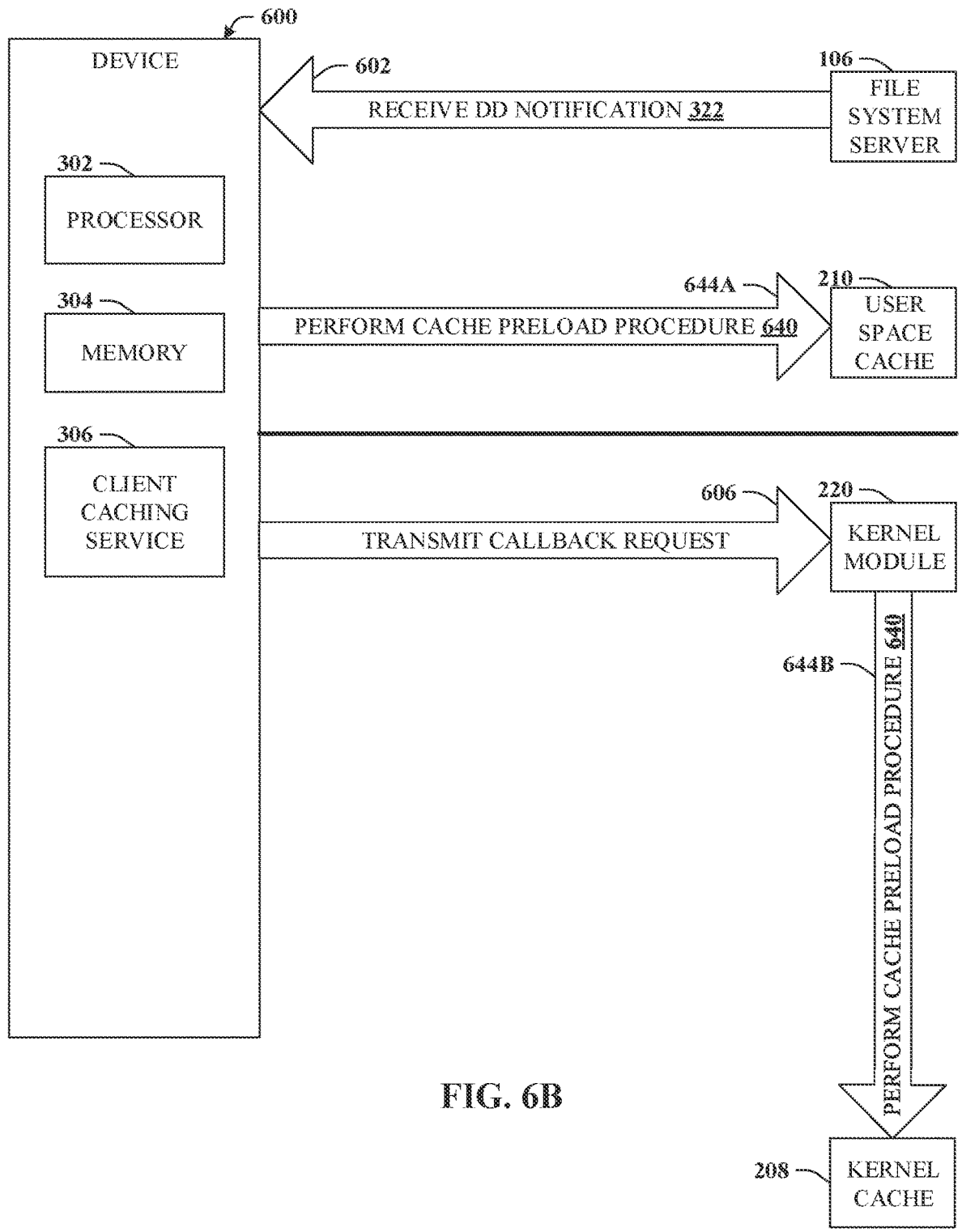
FIG. 6B depicts a schematic block diagram illustrating an example device that can leverage directory delegation in order to provide cache pre-loading in accordance with certain embodiments of this disclosure.

With reference now to FIG. 6B, a schematic block diagram is depicted illustrating an example device 600 that can leverage directory delegation in order to provide cache pre-loading techniques in accordance with certain embodiments of this disclosure. Thus, in addition to leveraging directory delegation functions to provide improved cache coherency (e.g., detailed in connection with FIG. 6A), the disclosed techniques can further be utilized to preload elements to a client cache.

As illustrated at reference numeral 602, it is again assumed that device 600 receives directory delegation notification 322, informing of a change to a specified file system element. In this embodiments, device 600 can manage a preload procedure 640 that can preload information contained in directory delegation notification 322 into either or both of user space cache 210 or kernel cache 208. Once more, it is simpler to implement cache preload procedure 640 on user space cache 210, but additional benefits can be realized by implementing cache preload procedure 640 on kernel cache 208.

As illustrated by reference numeral 644A, user space cache 210 is utilized, so cache preload procedure 640 can be directly applied to user space cache 210 based on the contents of notification 322. Additionally or alternatively, as illustrated by reference numeral 644B, kernel cache 208 is utilized. Hence, cache preload procedure 640 can be applied to kernel cache 208. In some embodiments, cache update procedure 326 can comprise cache preload procedure 640.

For example, suppose directory delegation notification 322 indicates attributes relating to adding a name. Such can include attributes of the newly added file. Given a file system server that implements that optional data, the client (e.g., user space 216 and kernel space 214 working together) can create the cache state in client cache 318 (e.g., user space cache 210 or kernel cache 208) describing that new file from the notification 322. While there is no guarantee that particular cache entry will be subsequently referenced, the cost of creating the entry is low and in workloads where there is a significant probability a newly named file will be subsequently accessed or have its attributes read, such preloading can provide improved performance and can be used in tandem with any suitable cache eviction algorithm or protocol.

In some embodiments utilizing cache preload procedure 640, if an "add" or "change file attributes" notification 322 is received and the associated file system element (e.g., file) is not in client cache 318, and further the file type, NFS file handle, and file mode are supplied by notification 322, the file state for that particular file can be created. If the full set of attributes is included in notification 322, those can also be saved as valid cached attributes of the file; if not, then the file state can be created but marked as not having current valid attributes.

Example Methods

Figure 7:
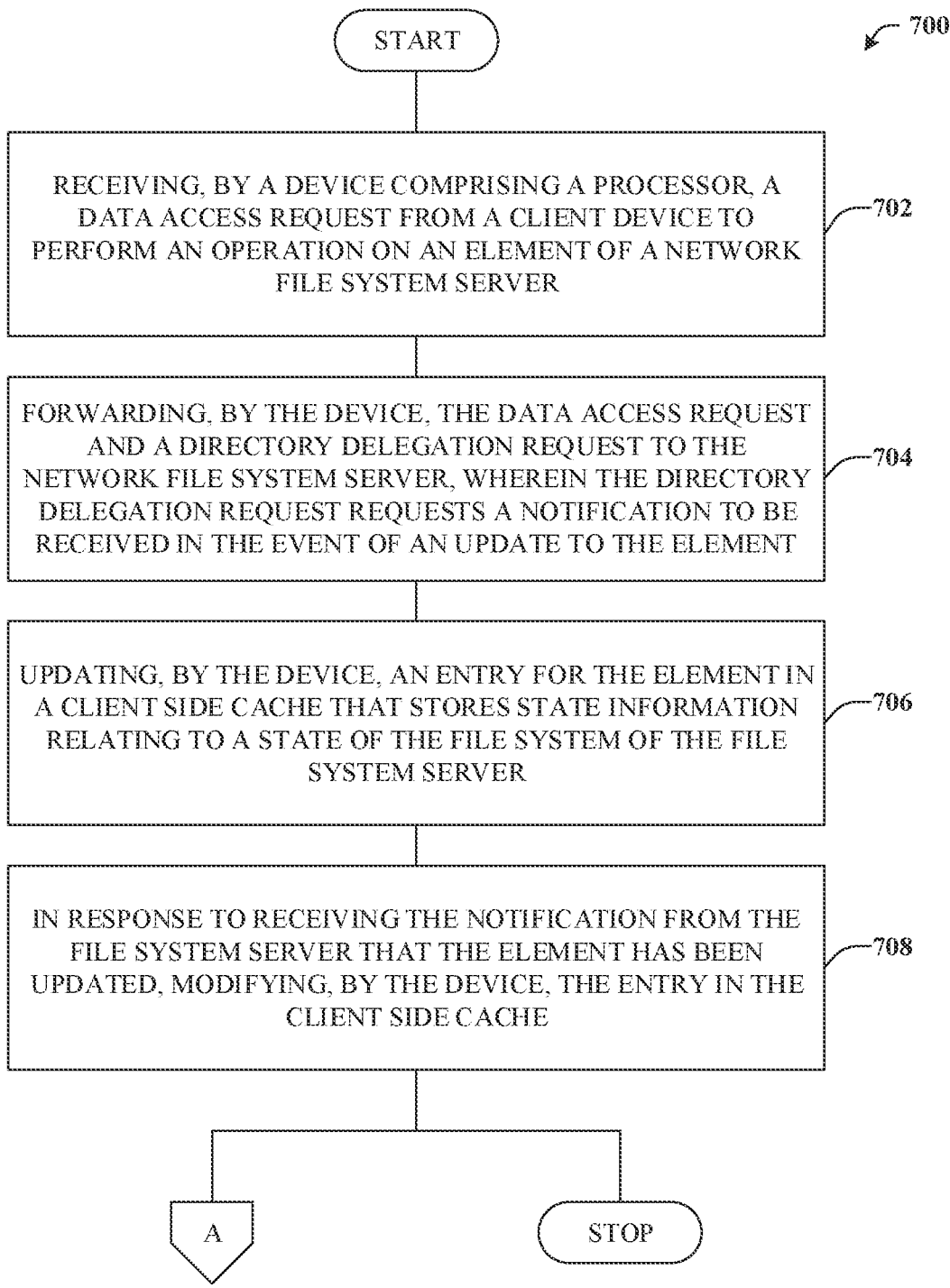
FIG. 7 illustrates an example method that can leverage directory delegation in order to maintain cache coherency for a client side cache in accordance with certain embodiments of this disclosure.
Figure 8:
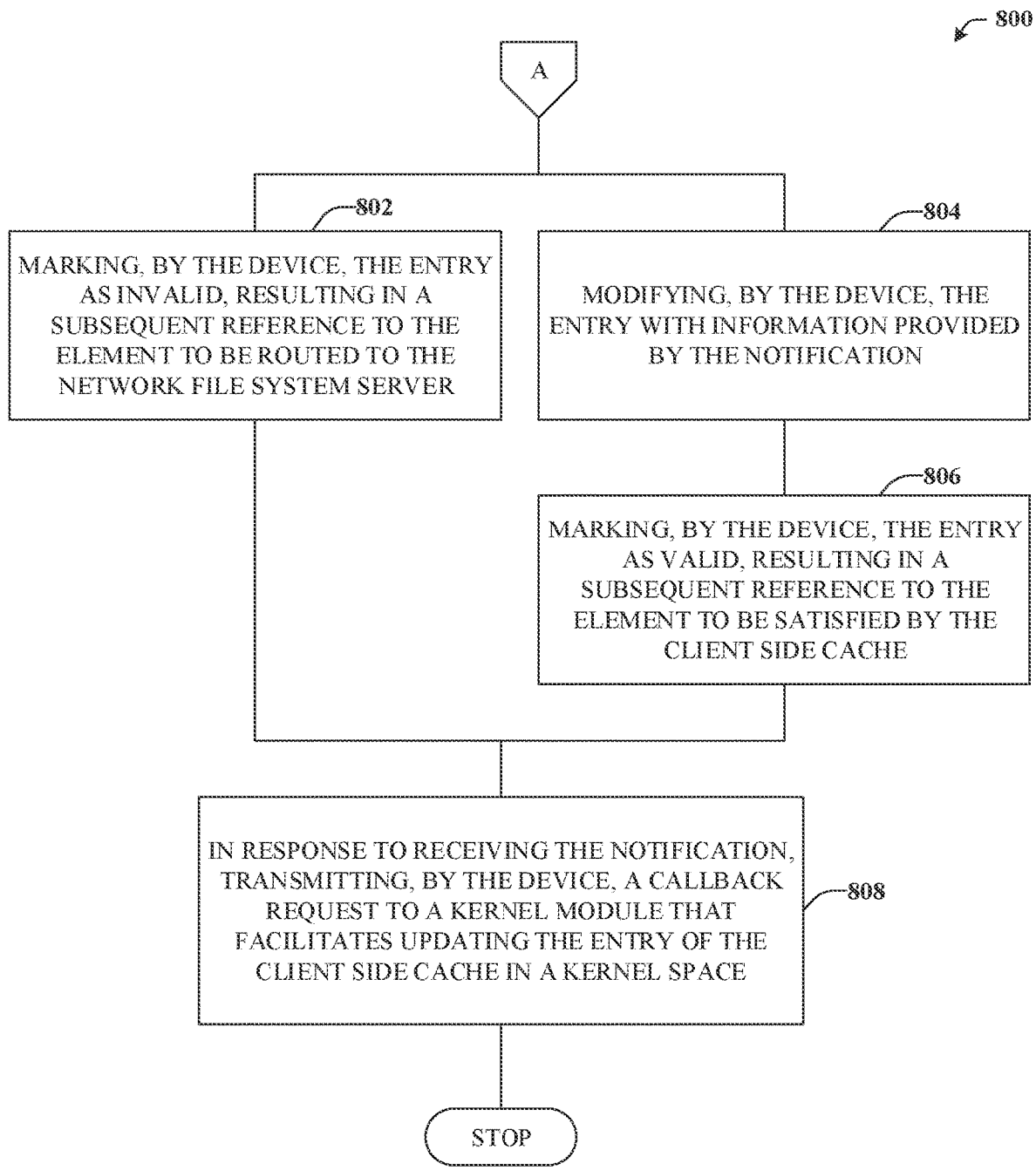
FIG. 8 illustrates an example method that can provide for additional functionality or elements relating to leveraging directory delegation in order to maintain cache coherency for a client side cache in accordance with certain embodiments of this disclosure.

FIGS. 7 and 8 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Turning now to FIG. 7, exemplary method 700 is depicted. Method 700 can leverage directory delegation in order to maintain cache coherency for a client side cache in accordance with certain embodiments of this disclosure. While method 700 describes a complete method, in some embodiments, method 700 can include one or more elements of method 800, as illustrated by insert A.

At reference numeral 702, a device comprising a processor can receive a data access request. The data access request can be received from a client device. The data access request can be configured to perform an operation on an element of a network file system server such as a file or the like. As examples, the data access request can be a request to read, write, delete, or otherwise access the file system element.

At reference numeral 704, the device can forward the data access request and a directory delegation request to the network file system server. The directory delegation request can request a notification from the file server be issued in the event of an update to the element. In some embodiments, the type of notification as well as the type of information included in the notification can be configured and/or specified by the directory delegation request.

At reference numeral 706, the device can update an entry for the element in a client side cache. The client side cache can be configured to store state information relating to a state of the file system of the file system server. In that regard, the entry can be for the particular element specified. In some embodiments, the client side cache can be included in a user space or domain. In some embodiments, the client side cache can be include in a kernel space or domain.

At reference numeral 708, in response to receiving the notification from the file system server that the element has been updated, the device can modify the entry in the client side cache. For example, information specified in the notification represents authoritative information regarding the specified element and can be utilized to update the state information included in the client side cache. Method 700 can terminate in some embodiments, or proceed to insert A in other embodiments, which is further detailed in connection with FIG. 8.

Turning now to FIG. 8, exemplary method 800 is depicted. Method 800 can provide for additional functionality or elements relating to leveraging directory delegation in order to maintain cache coherency for a client side cache in accordance with certain embodiments of this disclosure.

For example, the manner in which the entry is modified (e.g., in connection with reference numeral 708 of FIG. 7) can depend on the approach or techniques selected. For instance, in some embodiments, the device can mark the entry or a portion of the entry as invalid, which is illustrated at reference numeral 802. Marking the entry or some portion thereof as invalid can result in a subsequent reference to the element (or the associated portions) to be routed to the network file system server. Implementing this approach can be preferred when the notification does not contain sufficient information or to simplify the implementation (e.g., based on a policy, workload characteristics, or another suitable factor).

In other embodiments, the device can modify the entry with information provided by the notification, as illustrated at reference numeral 804. At reference numeral 806, the device can mark the entry or a suitable portion of the entry as valid, which is illustrated at reference numeral 804. Marking the entry or some portion thereof as valid can result in a subsequent reference to the element (or the associated portions) to be satisfied without routing to the network file system server. Implementing this approach can be preferred when the notification contains sufficient information or to potentially improve caching efficiency of the implementation.

At reference numeral 808, in response to receiving the notification, the device can transmit a callback request to a kernel module. This callback request can facilitate updating the entry of the client side cache in a kernel space. The updating can be based on information included in the notification.

Example Operating Environments

Figure 9:
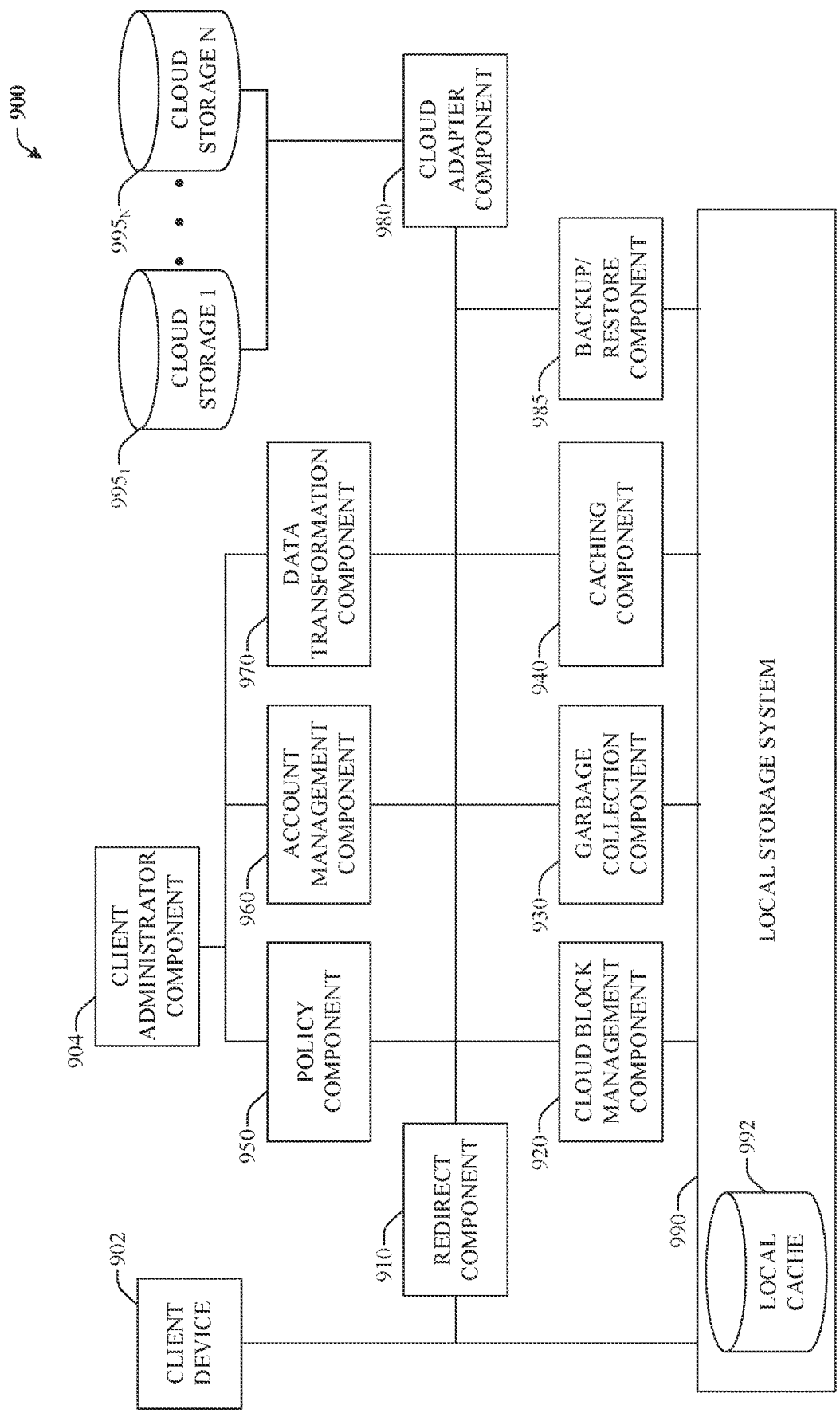
FIG. 9 illustrates a block diagram of an example distributed file storage system that employs tiered cloud storage in accordance with certain embodiments of this disclosure.
Figure 10:
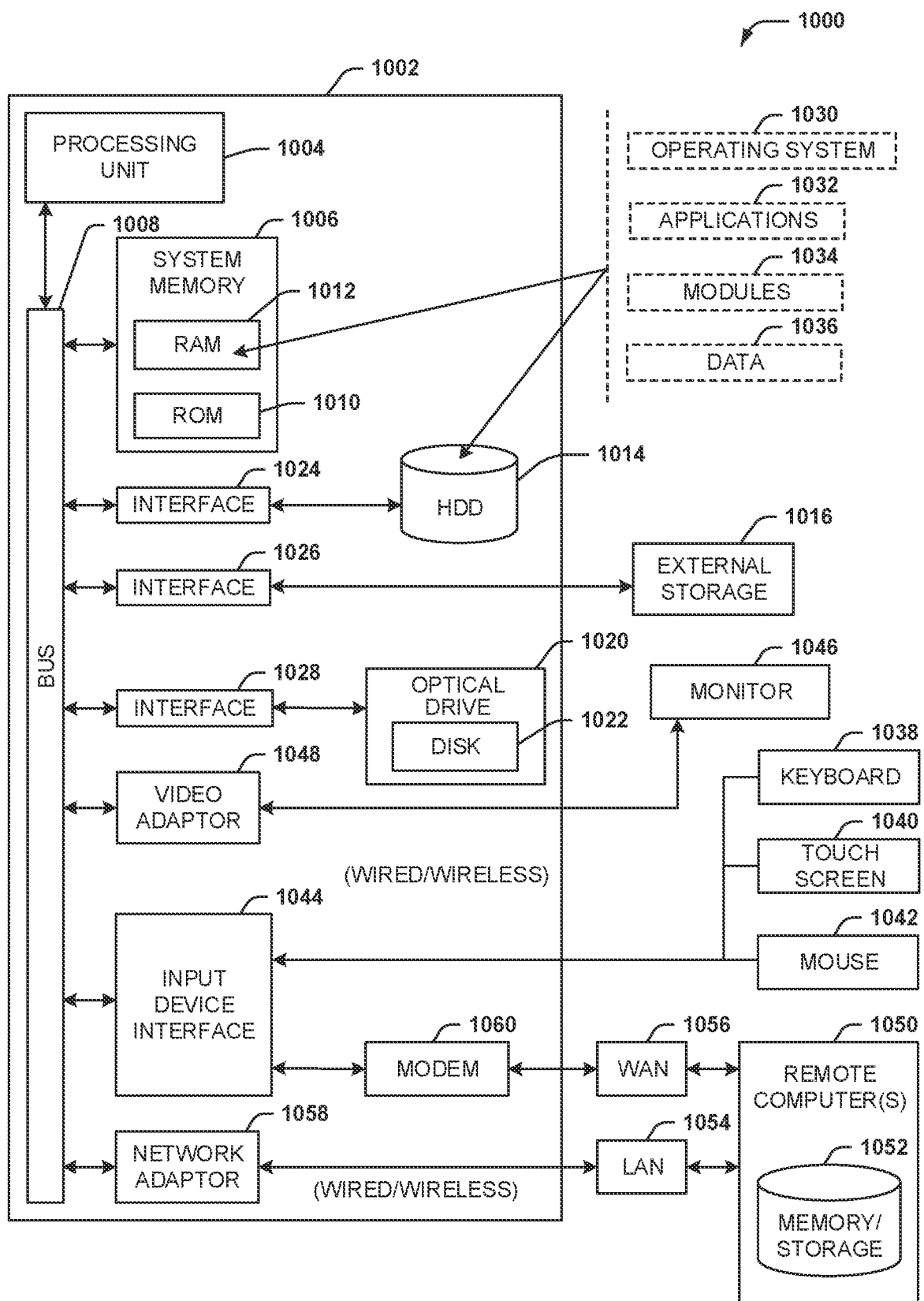
FIG. 10 illustrates an example block diagram of a computer operable to execute certain embodiments of this disclosure.

To provide further context for various example embodiments of the subject specification, FIGS. 9 and 10 illustrate, respectively, a block diagram of an example distributed file storage system 900 that employs tiered cloud storage and block diagram of a computer 1002 operable to execute the disclosed storage architecture in accordance with example embodiments described herein.

Referring now to FIG. 9, there is illustrated an example local storage system including cloud tiering components and a cloud storage location in accordance with implementations of this disclosure. Client device 902 can access local storage system 990. Local storage system 990 can be a node and cluster storage system such as an EMC Isilon Cluster that operates under OneFS operating system. Local storage system 990 can also store the local cache 992 for access by other components. It can be appreciated that the systems and methods described herein can run in tandem with other local storage systems as well.

As more fully described below with respect to redirect component 910, redirect component 910 can intercept operations directed to stub files. Cloud block management component 920, garbage collection component 930, and caching component 940 may also be in communication with local storage system 990 directly as depicted in FIG. 9 or through redirect component 910. A client administrator component 904 may use an interface to access the policy component 950 and the account management component 960 for operations as more fully described below with respect to these components. Data transformation component 970 can operate to provide encryption and compression to files tiered to cloud storage. Cloud adapter component 980 can be in communication with cloud storage 1 $995_1$ and cloud storage N $995_N$, where N is a positive integer. It can be appreciated that multiple cloud storage locations can be used for storage including multiple accounts within a single cloud storage location as more fully described in implementations of this disclosure. Further, a backup/restore component 985 can be utilized to back up the files stored within the local storage system 990.

Cloud block management component 920 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 920 in chunks of data. A uniform chunk size can be selected where all files that are tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 960 manages the information for cloud storage accounts. Account information can be populated manually via a user interface provided to a user or administrator of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 920 based on a list of mappings that the cloud block management component 920 manages. For example, each stub can be associated with an account, and the cloud block management component 920 can aggregate information from a set of stubs associated with the same account. Other example statistics that can be maintained include the number of recalls, the number of writes, the number of modifications, and the largest recall by read and write operations, etc. In one implementation, multiple accounts can exist for a single cloud service provider, each with unique account names and access codes.

The cloud adapter component 980 manages the sending and receiving of data to and from the cloud service providers. The cloud adapter component 980 can utilize a set of APIs. For example, each cloud service provider may have provider specific API to interact with the provider.

A policy component 950 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 930. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 930 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 940 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 920, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 940 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 940 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that the file has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time the stub file is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tracking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 970 can encrypt and/or compress data that is tiered to cloud storage. In relation to encryption, it can be appreciated that when data is stored in off-premises cloud storage and/or public cloud storage, users can request or require data encryption to ensure data is not disclosed to an illegitimate third party. In one implementation, data can be encrypted locally before storing/writing the data to cloud storage.

In one implementation, the backup/restore component 985 can transfer a copy of the files within the local storage system 990 to another cluster (e.g., target cluster). Further, the backup/restore component 985 can manage synchronization between the local storage system 990 and the other cluster, such that, the other cluster is timely updated with new and/or modified content within the local storage system 990.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various example embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1094 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an example embodiment, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more example embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:
at least one processor; and
at least one memory that stores executable instructions that, when executed by the at least one processor, facilitate performance of operations, comprising:
receiving a data access request from a client device to perform an operation on an element of a file system of a file system server;
forwarding the data access request and a directory delegation request to the file system server, wherein the directory delegation request:
requests a notification relating to updates to the element; and
configurably specifies information that is to be included in the notification;
modifying an entry for the element in a client side cache that stores state information relating to a state of the file system of the file system server; and
in response to receiving the notification from the file system server that the element has been updated, performing a cache update procedure that updates the entry in the client side cache.

2. The device of claim 1, wherein the notification comprises information indicative of at least one of: a file type, a file size, a file system identifier, a file identifier, a directory file handle, an access control attribute, an attribute change identifier, or a file content change timestamp.

3. The device of claim 1, wherein the entry for the element in the client side cache is modified based on a response from the file system server to the data access request, comprising creating the entry in the event a name for the element does not exist in the client side cache or updating the entry in the event the name already exists.

4. The device of claim 1, wherein the cache update procedure marks the entry as invalid, resulting in subsequent references to the element to be routed to the file system server.

5. The device of claim 1, wherein the cache update procedure updates the entry with information provided by the notification and marks the entry as valid, resulting in subsequent references to the element to be satisfied by the client side cache.

6. The device of claim 1, wherein the client side cache is situated in a user space or domain comprising a process that is executed by an operating system via a kernel module.

7. The device of claim 1, wherein the client side cache is situated in a kernel space or domain comprising a kernel of an operating system.

8. The device of claim 7, wherein the operations further comprise, in response to receiving the notification, transmitting a callback request to a kernel module that facilitates updating the entry of the client side cache that is situated in the kernel space or domain.

9. The device of claim 1, wherein the client side cache is situated partially in a user space or domain of a client node and partially in a kernel space or domain of the client node.

10. The device of claim 1, wherein the operations further comprise performing a cache preload procedure that adds a different entry to the client side cache in response to receiving the notification that refers to a different element that is not currently referenced by the client side cache.

11. A non-transitory computer-readable medium comprising instructions that, in response to execution, cause a system comprising at least one processor to perform operations, comprising:
receiving a data access request from a client device to perform an operation on a file of a file system of a file system server;
in response to determining that valid information for the file is not included in a client side cache, forwarding the data access request and a directory delegation request to the file system server, wherein the directory delegation request requests a notification relating to updates to the file, and wherein the directory delegation request specifies information that is to be included in the notification in a configurable manner;
based on a response to the data access request, modifying an entry for the file in the client side cache that stores state information relating to a state of the file system of the file system server; and
in response to receiving the notification from the file system server that the file has been updated, performing a cache update procedure that updates the entry in the client side cache.

12. The non-transitory computer-readable medium of claim 11, wherein the file system is configured according to a network file system protocol.

13. The non-transitory computer-readable medium of claim 11, wherein the cache update procedure marks the entry as invalid, resulting in subsequent references to the element to be routed to the file system server.

14. The non-transitory computer-readable medium of claim 11, wherein the cache update procedure updates the entry with information provided by the notification and marks the entry as valid, resulting in a subsequent reference to the element to be satisfied by the client side cache.

15. The non-transitory computer-readable medium of claim 11, wherein the operations further comprise performing a cache preload procedure that adds a different entry to the client side cache in response to receiving the notification that refers to a different element that is not currently referenced by the client side cache.

16. A method, comprising:
receiving, by a device comprising at least one processor, a data access request from a client device to perform an operation on an element of a network file system server;
forwarding, by the device, the data access request and a directory delegation request to the network file system server, wherein the directory delegation request requests a notification to be received in the event of an update to the element and specifies information that is to be configurably included in the notification;
updating, by the device, an entry for the element in a client side cache that stores state information relating to a state of the file system of the file system server; and
in response to receiving the notification from the file system server that the element has been updated, modifying, by the device, the entry in the client side cache.

17. The method of claim 16, wherein the modifying the entry comprises marking, by the device, the entry as invalid, resulting in a subsequent reference to the element to be routed to the network file system server.

18. The method of claim 16, wherein the modifying the entry comprises modifying the entry with information provided by the notification and marking, by the device, the entry as valid, resulting in a subsequent reference to the element to be satisfied by the client side cache.

19. The method of claim 16, further comprising, in response to receiving the notification, transmitting, by the device, a callback request to a kernel module that facilitates updating the entry of the client side cache in a kernel space.

20. The method of claim 16, further comprising performing a cache preload procedure that adds a different entry to the client side cache in response to receiving the notification that refers to a different element that is not currently referenced by the client side cache.

* * * * *